US009432696B2

(12) United States Patent
Chong et al.

(10) Patent No.: US 9,432,696 B2
(45) Date of Patent: Aug. 30, 2016

(54) SYSTEMS AND METHODS FOR LOW COMPLEXITY FORWARD TRANSFORMS USING ZEROED-OUT COEFFICIENTS

(71) Applicant: QUALCOMM Incorporated, San Diego, CA (US)

(72) Inventors: In Suk Chong, San Diego, CA (US); Yang Yu, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 14/216,086

(22) Filed: Mar. 17, 2014

(65) Prior Publication Data

US 2015/0264403 A1 Sep. 17, 2015

(51) Int. Cl.
*H04N 19/61* (2014.01)
*H04N 19/186* (2014.01)
(Continued)

(52) U.S. Cl.
CPC ............ *H04N 19/61* (2014.11); *H04N 19/122* (2014.11); *H04N 19/132* (2014.11); *H04N 19/176* (2014.11); *H04N 19/18* (2014.11)

(58) Field of Classification Search
None
See application file for complete search history.

(56) References Cited

U.S. PATENT DOCUMENTS 5,452,103 A 9/1995 Brusewitz
7,535,387 B1 5/2009 Delva
(Continued)

FOREIGN PATENT DOCUMENTS

EP 2257072 A1 12/2010
JP 2004064725 A 2/2004
(Continued)

OTHER PUBLICATIONS

Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.
(Continued)

*Primary Examiner* — Frederick Bailey
(74) *Attorney, Agent, or Firm* — Knobbe Martens Olson & Bear LLP

(57) ABSTRACT

Systems and methods for low complexity forward transforms using zeroed-out coefficients are described herein. One aspect of the subject matter described in the disclosure provides a video encoder comprising a memory configured to store a video block. The video encoder further comprises a processor in communication with the memory. The processor is configured to determine a full power value of the video block. The processor is further configured to determine a reduced transform coefficient matrix, wherein the reduced transform coefficient matrix comprises an inner region of zero or non-zero values of the same inner region of a full transform coefficient matrix and an outer region of zero values, wherein the reduced transform coefficient matrix and the full transform coefficient matrix have the same size. The processor is further configured to determine a partial power value of the video block using the reduced transform coefficient matrix. The processor is further configured to transform the video block from a pixel domain to a coefficient domain using the reduced transform coefficient matrix based on the full power value and partial power value. The processor is further configured to encode the transformed video block.

26 Claims, 7 Drawing Sheets

(51) Int. Cl.
H04N 19/182 (2014.01)
H04N 19/176 (2014.01)
H04N 19/18 (2014.01)
H04N 19/122 (2014.01)
H04N 19/132 (2014.01)

(56) References Cited

U.S. PATENT DOCUMENTS

| | | | |
|---|---|---|---|
| 8,571,340 B2 | 10/2013 | Reznik | |
| 2004/0066974 A1 | 4/2004 | Karczewicz et al. | |
| 2005/0058355 A1 | 3/2005 | Mitchell et al. | |
| 2005/0123207 A1 | 6/2005 | Marpe et al. | |
| 2008/0031325 A1 | 2/2008 | Qi | |
| 2008/0219345 A1* | 9/2008 | Li | H04L 65/607 375/240.2 |
| 2009/0028239 A1 | 1/2009 | Schuur et al. | |
| 2009/0086816 A1* | 4/2009 | Leontaris | H04N 19/176 375/240.03 |
| 2009/0175332 A1 | 7/2009 | Karczewicz et al. | |
| 2009/0232204 A1 | 9/2009 | Lee et al. | |
| 2010/0220796 A1 | 9/2010 | Yin et al. | |
| 2011/0096834 A1* | 4/2011 | Cheon | H04N 19/00533 375/240.12 |
| 2012/0082212 A1 | 4/2012 | Sadafale et al. | |
| 2012/0082231 A1 | 4/2012 | Rojals et al. | |
| 2012/0082232 A1 | 4/2012 | Sole Rojals et al. | |
| 2012/0128066 A1 | 5/2012 | Shibahara et al. | |
| 2012/0134408 A1 | 5/2012 | Shibahara et al. | |
| 2013/0003856 A1 | 1/2013 | Saxena et al. | |
| 2013/0114732 A1 | 5/2013 | Dong et al. | |
| 2013/0117343 A1 | 5/2013 | Budagavi | |
| 2013/0142248 A1 | 6/2013 | Cook et al. | |
| 2013/0162769 A1* | 6/2013 | Zhou | H04N 5/14 348/43 |
| 2013/0195177 A1 | 8/2013 | Hong et al. | |
| 2013/0243083 A1 | 9/2013 | Sezer | |
| 2015/0264400 A1 | 9/2015 | Chong et al. | |

FOREIGN PATENT DOCUMENTS

| | | |
|---|---|---|
| JP | 2006501740 A | 1/2006 |
| KR | 20050052523 A | 6/2005 |
| KR | 20130070595 A | 6/2013 |
| RU | 2117388 C1 | 8/1998 |
| WO | WO-2004032032 A1 | 4/2004 |
| WO | WO-2008002881 A2 | 1/2008 |
| WO | WO-2011142817 A1 | 11/2011 |
| WO | WO-2012009237 A1 | 1/2012 |
| WO | WO-2012045041 A1 | 4/2012 |

OTHER PUBLICATIONS

Bross, B., et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Chen et al., "A low-complexity computation scheme of discrete cosine transform and quantization with adaptation to block contents", The 2000 IEEE International Symposium on Circuits and Systems. Proceedings Piscataway, NJ, USA, IEEE, vol. 1, May 1, 2000, pp. I_631-I_634, XP010503277, ISBN: 978-0-7803-5482-1.
Davies et al., "Suggestion for a Test Model", 1. JCT-VC Meeting, Apr. 15, 2010-Apr. 23, 2010, Dresden, (JointCollaborative Team on Video Coding of ISO/IEC JTCI/SC29/WGII and ITU-TSG.16), pp. 30, May 7, 2010, XP030007526.
Ding L., et al., "H.263 based facial image compression for low bitrate Communications", Wescanex 97: Conference on Communications, Power and Computing. Proceedings, IEEE, New York, NY, USA, May 22, 1997, pp. 30-34, XP010250172, ISBN: 978-0-7803-41 47-0.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Marpe D., et al., "Context-based adaptive binary arithmetic coding in the H.264/AVC video compression standard", IEEE Transactions on Circuits and Systems for Video Technology, Jul. 2003, vol. 13 (7), pp. 620-636.
Sze, V., et al., "Modification to JCTVC-E227 in CE11 for Reduced Dependency with MDCS," Document JCTVC-E489, WG11 No. m20208, 5th Meeting: Geneva, CH, Mar. 16-23, 2011, 2 pp.
Sasai H., et al.,"CE11: Context size reduction for the significance map", 96. MPEG Meeting; Mar. 21, 2011-Mar. 25, 2011; Geneva; (Motion Picture Expert Group or ISO/IEC JTC1/SC29/WG11), , No. m19750, Mar. 18, 2011, XP030048317; pp. 6.
Sole J., et al., "Reduced complexity 32×32 transform by coefficient zero-out", 3. JCT-VC Meeting; 94. MPEG Meeting; Oct. 7, 2010-Oct. 15, 2010; Guangzhou; (Joint Collaborative Team on Video Coding of ISO/IECJTC1/SC29/WG11 and ITU-TSG.16), No. JCTVC-C237, Oct. 2, 2010, XP030007944; pp. 4.
Chen, W., et al., "A Fast Computational Algorithm for the Discrete Cosine Transform", IEEE Transactions on Communications, vol. com-25, No. 9, pp. 1004-1009, Sep. 1877.
Wasilewski et al., "Adaptive Segmentation of Wavelet Transform Coefficients for Video Compression," Proceedings of the SPIE— The International Society for Optical Engineering, v3974, 691-699, Jan. 25-28, 2000.
Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012]; pp. 153.
Wiegand, T., et al., "WD3: Working Draft 3 of High-Efficiency Video Coding," Document JCTVC-E603, 5th Meeting: Geneva, CH, Mar. 16-23, 2011, pp. 193.
Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010; pp. 137.
Zhou, "Coding Efficiency Test on Large Block Size Transforms in HEVC," Document JCTVC-B028, 2nd Meeting: Geneva, CH, Jul. 21-28, 2010, 3 pp.
Zhou et al., "TE 12: Evaluation of Transform Unit (TU) Size," Document JCTVC-C056, 3rd Meeting: Guangzhou, CN, Oct. 7-15, 2010, 9 pp.
Budagavi M., et al., "Core Transform Design in the High Efficiency Video Coding (HEVC) Standard," IEEE Journal of Selected Topics in Signal Processing, Dec. 2013, vol. 7 (6), pp. 1029-1041.
Meher P.K., et al., "Efficient Integer DCT Architectures for HEVC," IEEE Transactions on Circuits and Systems for Video Technology, 2013, pp. 1-11.
Sze V, "Reduction in contexts used for significant_coeff_flag and coefficient level", Joint Collaborative Team on Video Coding (JCT-VC) of ITU-T SG16 WP3 and ISO/IEC JTC1/SC29/WG11 6th Meeting: Torino, IT, Jul. 14-22, 2011, [JCTVC-F132]; 4 pages.
Cai X., et al., "Algorithms for Transform Selection in Multiple-Transform Video Compression", IEEE Transactions on Image Pro-

(56) References Cited

OTHER PUBLICATIONS cessing, IEEE Service Center, Piscataway, NJ, US, vol. 22, No. 12, Dec. 1, 2013, pp. 5395-5407, XP011531863, ISSN: 1057-7149, DOI: 10.1109/TIP.2013.2284073 [retrieved on Nov. 7, 2013].
Hong Y.M., et al., "Low-Complexity 16×16 and 32×32 Transforms and Partial Frequency Transform," JCTVC-C209, Joint Collaborative Team on Video Coding (JCT-VC) of ITU-T SG16 WP3 and ISO/IEC JTC1/SC29/WG11, 3rd Meeting, Guangzhou, CN, Oct. 7-15, 2010, pp. 1-11.
International Search Report and Written Opinion—PCT/US2015/020177—ISA/EPO—Nov. 26, 2015.
Liang J., et al., "Fast Multiplierless Approximations of the DCT with the Lifting Scheme", IEEE Transactions on Signal Processing, vol. 49, No. 12, Dec. 2001, XP055235999, pp. 3032-3044.

* cited by examiner

SYSTEMS AND METHODS FOR LOW COMPLEXITY FORWARD TRANSFORMS USING ZEROED-OUT COEFFICIENTS

CROSS-REFERENCE TO RELATED APPLICATIONS

The subject matter of this application is related to U.S. application Ser. No. 13/249,020, entitled "ZERO-OUT OF HIGH FREQUENCY COEFFICIENTS AND ENTROPY CODING RETAINED COEFFICIENTS USING A JOINT CONTEXT MODEL," and filed Sep. 29, 2011, the entirety of which is incorporated herein by reference.

TECHNICAL FIELD

This disclosure relates to video encoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, smartphones, video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs), and/or coding nodes. CUs may be further partitioned into one or more prediction units (PUs) to determine predictive video data for the CU. The video compression techniques may also partition the CUs into one or more transform units (TUs) of residual video block data, which represents the difference between the video block to be coded and the predictive video data. Linear transforms, such as a two-dimensional discrete cosine transform (DCT), may be applied to a TU to transform the residual video block data from the pixel domain to the frequency domain to achieve further compression. Further, video blocks in an intra-coded (I) slice of a picture may be encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

In older video standards, such as AVC, forward transform and inverse transform size (e.g., 4×4 and 8×8) did not act as a bottleneck for video encoding performance. However, more modern video coding standards (e.g., HEVC and its extensions, etc.) utilize up to 16×16 and 32×32 forward transform and inverse transform coefficient matrix sizes, which can act as a limiting factor on coding speed and efficiency during the coding process. The larger transforms require more complexity and cycles to process when transforming from the pixel domain into the coefficient domain. In the interest of coding efficiency, the coding performance would benefit from a process that reduces the complexity of the large forward transforms in the video encoder. Some advantages of the techniques disclosed herein relate to improving coding efficiency and reducing computational resource requirements during video encoding by reducing the complexity of the forward transforms in the encoder.

SUMMARY

In general, this disclosure describes techniques related to improving video encoding performance by conditionally utilizing (e.g., full or partial utilization of) or modifying (e.g., zeroing-out) transform matrix coefficients during the transform process. For example, in one embodiment, rather than performing a transform using a full 32×32 transform coefficient matrix, a selected portion of coefficients may be zeroed-out. This results in a 32×32 transform coefficient matrix having a non-zero value inner subset region and a zero value outer region. Because the resulting matrix will include an area of all zero values (e.g., the outer region), a subsequent transform operation that uses the modified matrix will require fewer computational resources and will yield improved video encoding performance. Conditions are provided as to how and when to determine a zero-value outer region in order to reduce or minimize the content loss during from performing such transform operation.

The details of one or more examples are set forth in the accompanying drawings and the description below. Other features, objects, and advantages will be apparent from the description and drawings, and from the claims.

One aspect of the subject matter described in the disclosure provides a video encoder comprising a memory configured to store a video block. The video encoder further comprises a processor in communication with the memory. The processor is configured to determine a full power value of the video block. The processor is further configured to determine a reduced transform coefficient matrix, wherein the reduced transform coefficient matrix comprises an inner region of zero or non-zero values of the same inner region of a full transform coefficient matrix and an outer region of zero values, wherein the reduced transform coefficient matrix and the full transform coefficient matrix have the same size. The processor is further configured to determine a partial power value of the video block using the reduced transform coefficient matrix. The processor is further configured to transform the video block from a pixel domain to a coefficient domain using the reduced transform coefficient matrix based on the full power value and partial power value. The processor is further configured to encode the transformed video block.

Another aspect of the subject matter described in the disclosure provides a method of encoding video. The method includes storing a video block. The method further includes determining a full power value of the video block. The method further includes determining a reduced transform coefficient matrix, wherein the reduced transform coefficient matrix comprises an inner region of zero or non-zero values of the same inner region of a full transform coefficient matrix and an outer region of zero values, wherein the reduced transform coefficient matrix and the full transform coefficient matrix have the same size. The method further includes determining a partial power value of the video block using the reduced transform coefficient matrix. The method further includes transforming the video block from a pixel domain to a coefficient domain using the reduced transform coefficient matrix based on the full power value and partial power value. The method further includes encoding the transformed video block.

Another aspect of the subject matter described in the disclosure provides a non-transitory computer-readable medium. The medium comprises code that, when executed, causes an apparatus to store a video block. The medium further comprises code that, when executed, causes an apparatus to determine a full power value of the video block. The medium further comprises code that, when executed, causes an apparatus to determine a reduced transform coefficient matrix, wherein the reduced transform coefficient matrix comprises an inner region of zero or non-zero values of the same inner region of a full transform coefficient matrix and an outer region of zero values, wherein the reduced transform coefficient matrix and the full transform coefficient matrix have the same size. The medium further comprises code that, when executed, causes an apparatus to determine a partial power value of the video block using the reduced transform coefficient matrix. The medium further comprises code that, when executed, causes an apparatus to transform the video block from a pixel domain to a coefficient domain using the reduced transform coefficient matrix based on the full power value and partial power value. The medium further comprises code that, when executed, causes an apparatus to encode the transformed video block.

Another aspect of the subject matter described in the disclosure provides an apparatus for encoding video. The apparatus comprises means for storing a video block. The apparatus further comprises means for determining a full power value of the video block. The apparatus further comprises means for determining a reduced transform coefficient matrix, wherein the reduced transform coefficient matrix comprises an inner region of zero or non-zero values of the same inner region of a full transform coefficient matrix and an outer region of zero values, wherein the reduced transform coefficient matrix and the full transform coefficient matrix have the same size. The apparatus further comprises means for determining a partial power value of the video block using the reduced transform coefficient matrix. The apparatus further comprises means for transforming the video block from a pixel domain to a coefficient domain using the reduced transform coefficient matrix based on the full power value and partial power value. The apparatus further comprises means for encoding the transformed video block.

Figure 1:
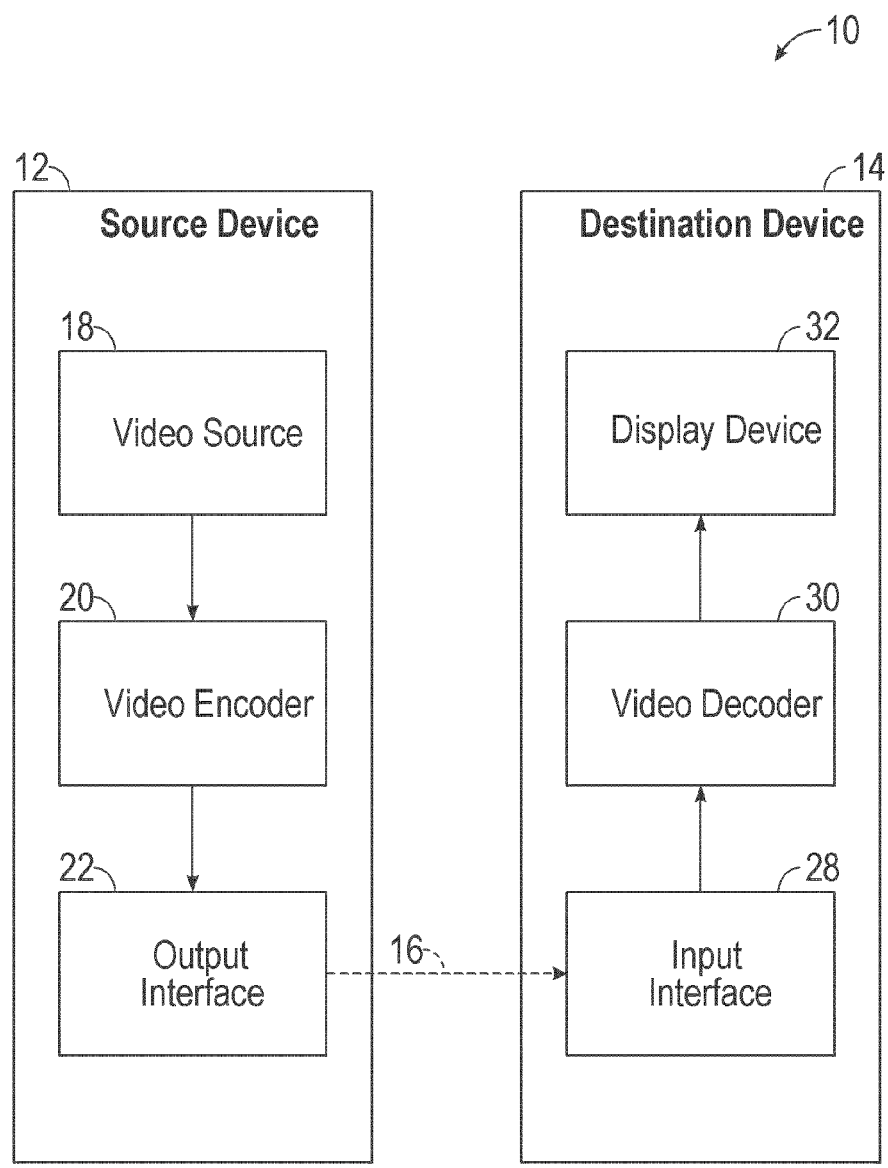
FIG. 1 is a block diagram illustrating an example video encoding and decoding system that may utilize techniques in accordance with aspects described in this disclosure.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The techniques described in this disclosure generally relate to forward transforms during video encoding. In one embodiment, such techniques relate to the High-Efficiency Video Coding (HEVC) standard and its extensions.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG).

As mentioned above, the HEVC standard utilizes forward transforms (e.g., in the HEVC encoder) and inverse transforms of up to 32×32 in size, whereas the AVC standard only utilized up to an 8×8 transform size. For example, to transform video information from the pixel domain into the coefficient domain in HEVC, an input vector of video pixel information may be multiplied by a transform matrix having 32×32 (1024) values). The larger transform sizes increase the coding efficiency of large code blocks in HEVC; however, it also increases the complexity, computing cycles, and processing time as compared to the smaller transform sizes. The methods described in this disclosure may reduce the increased complexity and cycles required to perform such large matrix multiplications when the encoder transforms from the pixel domain into the coefficient domain by simplifying the forward transform matrices.

In some implementations, zeroing out a subset, region, or area of the transform coefficients during matrix multiplication may simplify the forward transforms, because the computational resources required to multiply by zeroes is smaller than that of multiplying by non-zeroes. Further, zeroing-out random zeroes in a forward transform used during video encoding may result in a decrease of final video quality. To prevent or reduce such quality degradation, the methods described in this disclosure may first determine whether a matrix simplification or reduction is desirable. For example, in one embodiment, a method is provided in which an encoder first computes a difference in powers and compares that difference with a threshold to determine a number and a location of coefficients to zero-out, as further described in connection with FIGS. 6-7, below. By zeroing out coefficients in this methodical fashion, such methods may allow a transform processing unit of a video encoder to save computational resources while also preserving video quality.

In the video codecs using block-based processing (e.g., HEVC, in which video frames may be partitioned into video blocks or coding units), prediction blocks or prediction units (e.g., from inter or intra prediction) may be subtracted from original pixels. As further explained above and below with respect to FIGS. 1-3, the residual data may then be transformed into residual transform coefficients using forward transforms (e.g., discrete cosine transforms), quantized, and entropy encoded (e.g., to achieve further compression). The entropy encoding may be performed using various entropy coding engines (e.g., CAVLC, CABAC, etc.), which are further described below. Afterwards, and as also further described below, a decoder may then entropy decode, dequantize, and inverse transform the coefficients. Finally, the coefficients may be added back to the prediction blocks to form reconstructed pixels.

In one embodiment of video coding, an image block may first be predicted using pixels from reconstructed, temporally and/or spatially neighboring blocks. The prediction error (sometimes referred to as "residue" or "residual") may then be transformed and quantized. For example, if S is a residue block of size N×N, the transformed block K can be derived using matrix multiplication as follows:

$$K=A*S*B$$

where K, A, and B are also of size N×N. A is the vertical transform matrix and B is the horizontal transform matrix. In some embodiments, A and B are the transpose of each other, (e.g., B=A' where "'" means transpose). In other embodiments, A and B are not the transpose of each other. When A and B are the transpose of each other, the previous equation becomes:

$$K=A*S*A'$$

Each transform (A and B) may include any of a variety of transforms. In some embodiments, the transform includes one of a discrete cosine transform (DCT), a discrete sine transform (DST), a Hadamard transform, a Haar transform, etc.

In an SVC extension, there may be multiple layers of video information. The bottom layer may serve as a base layer (BL), and the top layer may serve as an enhanced layer (EL) or "enhancement layer." All layers between the top and bottom layers may serve as either or both ELs or BLs. SVC may be used to provide quality scalability (or signal-to-noise ratio, SNR), spatial scalability, and/or temporal scalability.

An enhanced layer may have different spatial resolution than a base layer. Prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. Inter-layer residual prediction uses the residue of the base layer to predict the residue of the enhancement layer. One particular coding mode for an enhancement layer called the "Intra BL mode" includes a texture that may be predicted using the texture of the corresponding (sometimes referred to as "co-located", e.g., located at the same spatial location) blocks in base layer.

In inter-layer residual prediction, the residue of the base layer may be used to predict the current block in the enhancement layer. The residue may be defined as the difference between the temporal prediction for a video unit and the source video unit.

In residual prediction, the residue of the base layer is also considered in predicting the current block. For example, the current block may be reconstructed using the residue from the enhancement layer, the temporal prediction from the enhancement layer, and the residue from the base layer. The current block may be reconstructed according to the following equation:

$$\hat{I}e=re+Pe+rb$$

where $\hat{I}e$ denotes the reconstruction of the current block, re denotes the residue from the enhancement layer, Pe denotes the temporal prediction from the enhancement layer, and rb denotes the residue prediction from the base layer.

For inter coding using difference domain, the current predicted block is determined based on the difference values between the corresponding predicted block samples in the enhancement layer reference picture and the corresponding predicted block samples in the scaled base layer reference picture. The difference values may be referred to as the difference predicted block. The co-located base layer reconstructed samples are added to the difference predicted block in order to obtain enhancement layer prediction samples.

The techniques described in this disclosure may address issues relating to complex computational requirements during matrix multiplication of forward transforms in HEVC. The techniques may improve the speed, efficiency, and efficacy at which an encoder and/or a transform processing unit may perform forward transform matrix multiplication.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, a video encoding and decoding system 10 includes a source device 12 that provides encoded video data to be decoded at a later time by a destination device 14. In particular, the source device 12 provides the video data to the destination device 14 via a computer-readable medium 16. The source device 12 and the destination device 14 may comprise any of a wide range of devices, including desktop computers, notebook (e.g., laptop) computers, tablet computers, set-top boxes, telephone handsets (e.g., smartphones), televisions, cameras, display devices, digital media players, video gaming consoles, video streaming devices, etc. In some cases, the source device 12 and the destination device 14 may be equipped for wireless communication.

As mentioned above, the destination device 14 may receive the encoded video data to be decoded via the computer-readable medium 16. The computer-readable medium 16 may comprise any type of medium or device capable of moving the encoded video data from the source device 12 to the destination device 14. In one example, the computer-readable medium 16 may comprise a communication medium (not pictured) to enable the source device 12 to transmit encoded video data directly to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may also form part of a packet-based network, such as a local area network, a wide-area network, or a global network (e.g., the Internet). The communication medium may include routers, switches, base stations, or any other equipment that may be useful to facilitate communication from the source device 12 to the destination device 14.

In some examples, the encoded data may be output from an output interface 22 to a storage device (not pictured). Similarly, the encoded data may be accessed from the storage device by an input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device 12. The destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. The destination device 14 may access the encoded video data through any standard data connection, including an Internet connection. The data connection may include a wireless channel (e.g., a Wi-Fi connection), a wired connection (e.g., DSL, cable modem, etc.), or a combination of both suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, the system 10 may be configured to support one-way or two-way video transmission for applications such as video streaming, video playback, video broadcasting, video telephony, etc.

In the example of FIG. 1, the source device 12 includes a video source 18, a video encoder 20, and the output interface 22. The destination device 14 includes the input interface 28, a video decoder 30, and a display device 32. In accordance with this disclosure, the video encoder 20 of the source device 12 may be configured to apply techniques for coding a bitstream including video data conforming to multiple standards or standard extensions. In other examples, the source device 12 and the destination device 14 may include other components or arrangements. For example, the source device 12 may receive video data from an external video source, such as an external camera. Likewise, the destination device 14 may interface with an external display device, rather than the integrated display device 32.

Although the techniques of this disclosure are generally performed by a video encoding device, the techniques may also be performed by a video encoder/decoder, typically referred to as a "CODEC." Moreover, the techniques of this disclosure may also be performed by a video preprocessor. The source device 12 and the destination device 14 are merely examples of such coding devices in which the source device 12 generates coded video data for transmission to the destination device 14. In some examples, the source device 12 and the destination device 14 may operate in a substantially symmetrical manner such that they each include video encoding and decoding components. Hence, the system 10 may support one-way or two-way video transmission between the source device 12 and the destination device 14, e.g., for video streaming, video playback, video broadcasting, video telephony, etc.

The video source 18 of the source device 12 may include a video capture device (not pictured), such as a video camera, a video archive containing previously captured video, a video feed interface to receive video from a video content provider, etc. As a further alternative, the video source 18 may generate computer graphics-based data or a combination of live video, archived video, and computer-generated video. In some cases, if the video source 18 is a video camera, the source device 12 and the destination device 14 may be camera phones or video phones. In another embodiment, the techniques described in this disclosure may be applicable to video coding in general and may be applied to wireless and/or wired applications. In each case, the captured, pre-captured, or computer-generated video may be encoded by the video encoder 20. The encoded video information may then be output by the output interface 22 onto the computer-readable medium 16.

The computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device 12 and provide the encoded video data to the destination device 14, e.g., via network transmission, direct wired communication, etc. Similarly, a computing device of a medium production facility, such as a disc stamping facility, may receive the encoded video data from the source device 12 and produce a disc containing the encoded video data. Therefore, the computer-readable medium 16 may include one or more computer-readable media of various forms.

The input interface 28 of the destination device 14 may receive information from the computer-readable medium 16. The information of the computer-readable medium 16 may include syntax information defined by the video encoder 20. The syntax information may also be used by the video decoder 30, which may include syntax elements describing characteristics and/or processing of blocks and other coded units. The display device 32 may display the decoded video data to a user and may comprise any of a variety of display devices such as a cathode ray tube (CRT), a liquid crystal display (LCD), a plasma display, an organic light emitting diode (OLED) display, or another type of display device.

The video encoder 20 and the video decoder 30 may operate according to a video coding standard, such as the High Efficiency Video Coding (HEVC) standard or any of its variations (e.g., the HEVC Test Model (HM)). Alternatively, the video encoder 20 and the video decoder 30 may operate according to other proprietary or industry standards, such as the ITU-T H.264 standard (MPEG-4), Part 10, Advanced Video Coding (AVC), ITU-T H.263, ITU-T H.262 (ISO/IEC MPEG-2 Visual), ISO/IEC MPEG-1 Visual, ITU-T H.261, or extensions of any such standards. In some aspects, the video encoder 20 and the video decoder 30 may be integrated with an audio encoder, audio decoder, MUX-DEMUX units (not pictured), or other hardware and software to handle encoding of both audio and video in a common data stream or separate data streams.

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware, or any combinations thereof. If necessary to perform the techniques of this disclosure, the video encoder 20 and/or the video decoder 30 may store instructions for software in a suitable, non-transitory computer-readable medium and execute the instructions in hardware using one or more processors. Each of the video encoder 20 and the video decoder 30 may be included in one or more encoders or decoders, either of which may be integrated as part of a combined encoder/decoder (CODEC) in a respective device. A device including the video encoder 20 and/or the video decoder 30 may comprise an integrated circuit, a microprocessor, and/or a wireless communication device, such as a cellphone.

The HEVC standard specifies that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or, in some instances, greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. The video encoder 20 of FIG. 1 may operate on video blocks within individual video slices in order to encode the video data. A video block may correspond to a coding node within a CU. The video blocks may have fixed or varying sizes, and may differ in size according to a specified coding standard.

HEVC supports prediction in various PU sizes. Assuming that the size of a particular CU is 2N×2N, HEVC supports intra-prediction in PU sizes of 2N×2N or N×N, and inter-prediction in symmetric PU sizes of 2N×2N, 2N×N, N×2N, or N×N. HEVC also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on the bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block may have N pixels in a vertical direction and N pixels in a horizontal direction, where N represents a nonnegative integer value. The pixels in a block may be arranged in rows and columns. Moreover, blocks may not necessarily have the same number of pixels in the horizontal direction as in the vertical direction. For example, blocks may comprise N×M pixels, where M is not necessarily equal to N.

Following intra-predictive or inter-predictive coding using the PUs of a CU, the video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. The video encoder 20 may form the TUs including the residual data for the CU, and then transform the TUs to produce transform coefficients for the CU.

Following any transforms to produce transform coefficients, the video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, the video encoder 20 may utilize a predefined scan order to scan the quantized transform coefficients to produce a serialized vector that can be entropy encoded. In other examples, the video encoder 20 may perform an adaptive scan. After scanning the quantized transform coefficients to form a one-dimensional vector, the video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. The video encoder 20 may also entropy encode syntax elements associated with the encoded video data for use by the video decoder 30 in decoding the video data.

The video encoder 20 may further send syntax data, such as block-based syntax data, frame-based syntax data, and GOP-based syntax data, to the video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
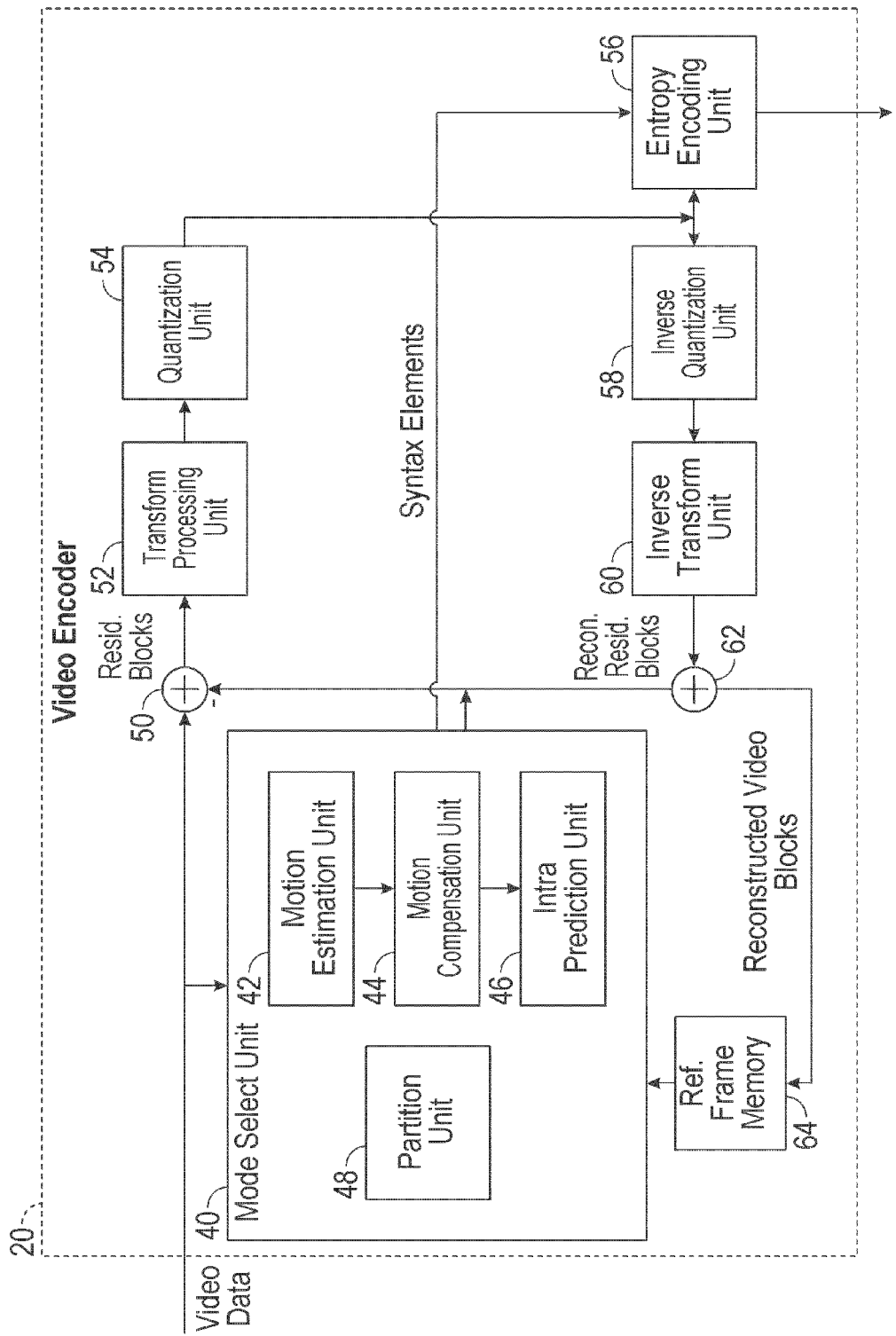
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. One or more of the units of the video encoder 20 may be configured to perform any or all of the techniques of this disclosure. As one example, a transform processing unit 52 may be configured to perform any or all of the transform techniques described in this disclosure. However, aspects of this disclosure are not so limited. In some examples, the techniques described in this disclosure may be shared among the various components of the video encoder 20. In some examples, a processor (not shown) may be configured to perform any or all of the techniques described in this disclosure. The video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

The video encoder 20 may receive a current video block within a video frame to be encoded. In the example of FIG. 2, the video encoder 20 includes a mode select unit 40, a reference frame memory 64, a summer 50, the transform processing unit 52, a quantization unit 54, and an entropy encoding unit 56. The mode select unit 40 includes a motion estimation unit 42, a motion compensation unit 44, an intra-prediction unit 46, and a partition unit 48. For video block reconstruction, the video encoder 20 may also include an inverse quantization unit 58, an inverse transform unit 60, and a summer 62. A deblocking filter (not pictured) may also be included to filter block boundaries to remove blockiness artifacts from reconstructed video. If desired, the deblocking filter would typically filter the output of the summer 62. Additional filters (in loop or post loop) may also be used in addition to the deblocking filter. Such filters are not shown for brevity, but if desired, may filter the output of the summer 50 (as an in-loop filter).

During the encoding process, the video encoder 20 may receive a video frame or slice to be coded. The frame or slice may be divided into multiple video blocks. The motion estimation unit 42 and the motion compensation unit 44 may perform inter-predictive coding of the received video block relative to one or more blocks in one or more reference frames to provide temporal prediction. The intra-prediction unit 46 may alternatively perform intra-predictive coding of the received video block relative to one or more neighboring blocks in the same frame or slice as the block to be coded to provide spatial prediction. The video encoder 20 may perform multiple coding passes, e.g., to select an appropriate coding mode for each block of video data.

Moreover, the partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). The mode select unit 40 may further produce a quadtree data structure indicative of partitioning of an LCU into sub-CUs. Leaf-node CUs of the quadtree may include one or more PUs and one or more TUs.

The mode select unit 40 may select one of the coding modes, intra or inter, e.g., based on error results, and provide the resulting intra- or inter-coded block to the summer 50 to generate residual block data and to the summer 62 to reconstruct the encoded block for use as a reference frame. The mode select unit 40 may also provide syntax elements, such as motion vectors, intra-mode indicators, partition information, and other such syntax information, to the entropy encoding unit 56.

The motion estimation unit 42 and the motion compensation unit 44 may be highly integrated, but are illustrated separately for conceptual purposes. Motion estimation, performed by the motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, the video encoder 20 may calculate values for sub-integer pixel positions of reference pictures stored in the reference frame memory 64. For example, the video encoder 20 may interpolate values of one-quarter pixel positions, one-eighth pixel positions, or other fractional pixel positions of the reference picture. Therefore, the motion estimation unit 42 may perform a motion search relative to the full pixel positions and fractional pixel positions and output a motion vector with fractional pixel precision.

The motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in the reference frame memory 64. The motion estimation unit 42 sends the calculated motion vector to the entropy encoding unit 56 and the motion compensation unit 44.

Motion compensation, performed by the motion compensation unit 44, may involve fetching or generating the predictive block based on the motion vector determined by the motion estimation unit 42. Again, the motion estimation unit 42 and the motion compensation unit 44 may be functionally integrated, in some examples. Upon receiving the motion vector for the PU of the current video block, the motion compensation unit 44 may locate the predictive block to which the motion vector points in one of the reference picture lists. The summer 50 may form a residual video block by subtracting pixel values of the predictive block from the pixel values of the current video block being coded, forming pixel difference values, as discussed below. The motion estimation unit 42 may perform motion estimation relative to luma components, and the motion compensation unit 44 may use motion vectors calculated based on the luma components for both chroma components and luma components. The mode select unit 40 may also generate syntax elements associated with the video blocks and the video slice for use by the video decoder 30 in decoding the video blocks of the video slice. The syntax elements may represent prediction information at one or more of a video sequence level, a video frame level, a video slice level, a video CU level, or a video PU level. For example, the motion compensation unit 44 may generate syntax elements indicating video block information including sizes of CUs, PUs, and TUs, and motion vector information for intra-mode prediction.

The intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, the intra-prediction unit 46 may encode a current block using various intra-prediction modes, e.g., during separate encoding passes, and the intra-prediction unit 46 (or the mode select unit 40, in some examples) may select an appropriate intra-prediction mode to use from the tested modes.

For example, the intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. The intra-prediction unit 46 may calculate ratios from the distortions and rates for the various encoded blocks to determine which intra-prediction mode exhibits the best rate-distortion value for the block.

After selecting an intra-prediction mode for a block, the intra-prediction unit 46 may provide information indicative of the selected intra-prediction mode for the block to the entropy encoding unit 56. The entropy encoding unit 56 may encode the information indicating the selected intra-prediction mode. The video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

The video encoder 20 forms a residual video block by subtracting the prediction data from the mode select unit 40 from the original video block being coded. The summer 50 may perform this subtraction operation. The transform processing unit 52 may apply a transform, such as a discrete cosine transform (DCT) or a conceptually similar transform, to the residual block, producing a video block comprising residual transform coefficient values. The transform processing unit 52 may perform other transforms which are conceptually similar to DCT. Wavelet transforms, integer transforms, sub-band transforms or other types of transforms may also be used. The transform processing unit 52 may then apply the transform to the residual block, producing a block of residual transform coefficients. The transform processing unit 52 may use the transform to convert the residual information from a pixel value domain to a transform domain, such as a frequency domain. More specifically, prior to application of the transform, the TU may comprise residual video data in the pixel domain, and, following application of the transform, the TU may comprise transform coefficients, which may be contained in a transform coefficient matrix, that represent the residual video data in the frequency domain.

Conventionally, the video encoder 20 maintains separate context models for each of the different sizes of TUs supported by the implemented video compression standard. For the HEVC standard, additional transform unit sizes, e.g., 32×32 up to 128×128, may be used to improve video coding efficiency, but the additional TU sizes also result in increased memory and computational requirements to maintain the context models for each of the additional transform unit sizes. In some cases, the larger TU sizes may use more contexts, which may result in increased memory and computational requirement to maintain the increased number of contexts for the larger TU sizes. To reduce the effects of this problem, the transform processing unit 52 may further be configured to perform any of the methods described above and below in regards to simplifying the forward transform during matrix multiplication (e.g., the coefficient zero-out methods described below and in regards to FIGS. 4-7).

In one embodiment, a process of zeroing transform coefficients includes setting values of a subset of transform coefficients within the transform coefficient matrix equal to zero. In one embodiment, the transform coefficients that are zeroed out are not computed or discarded; instead, the zeroed-out transform coefficients are simply set equal to zero and have no value to store or encode. In one embodiment, a predetermined matrix of transform coefficients is stored (e.g., a 32×32 matrix); however, only a smaller subset of such coefficients (e.g., 8×8, 16×16, etc.) is used (e.g., loaded into memory) to perform a forward transform. In another embodiment, all coefficients are initially loaded into memory, but certain ones of such coefficients are subsequently set to zero. In yet another embodiment, a predetermined transform coefficient matrix is not modified, but a processor configured to perform the matrix multiplication using the matrix is further configured to use zero values during or as the result of certain multiplication operations, depending upon the location of the coefficient within the coefficient matrix. All such implementations can be referred to as using zeroed-out transform coefficients, or a zeroed-out matrix, or zeroing, or zeroing out transform coefficients.

According to this disclosure, the zeroed-out transform coefficients are typically the higher frequency transform coefficients relative to the retained, lower frequency transform coefficients in the transform coefficient matrix. High frequency transform coefficients represent residual video data that ordinarily corresponds to very small pixel differences between the video block to be encoded and the predictive block. The high frequency transform coefficients, therefore, may contain so little residual video data that setting the values equal to zero has a negligible effect on decoded video quality.

As an example, the transform processing unit 52 may zero-out three-quarters of the transform coefficients (the "outer region") in a transform coefficient matrix. The video encoder 20 may then only need to buffer the retained one-quarter of the transform coefficients (the "inner region") during matrix multiplication. In this way, the transform processing unit 52 may produce a zeroed-out matrix with significant coefficients having a size 16×16 within the transform coefficient matrix, originally of size 32×32. This process is further described and demonstrated in FIGS. 4-7.

In the example described above, the transform processing unit 52 was configured to load a predetermined matrix of transform coefficient values, the matrix being a predetermined size (e.g., 32×32), and then zero out some of those coefficients (the "inner region," e.g., the 16×16 top-left portion) to produce a zeroed-out matrix, e.g., one-quarter of the original size of the 32×32 transform coefficient matrix. In other cases, the transform processing unit 52 may be configured to generate a zeroed-out matrix having a different "inner region" size by zeroing out a larger or smaller percentage of the coefficients depending on coding complexity requirements for the coding process. Moreover, in some cases, the transform processing unit 52 may be configured to generate an "inner region" having a rectangular area or any other shaped area.

The transform processing unit 52 may send the resulting transform coefficients to the quantization unit 54. The quantization unit 54 may then quantize the transform coefficients to further reduce the bit rate. The quantization process may reduce the bit depth associated with some or all of the coefficients. The degree of quantization may be modified by adjusting a quantization parameter. In some examples, the quantization unit 54 may then perform a scan of the matrix including the quantized transform coefficients. Alternatively, the entropy encoding unit 56 may perform the scan.

Following quantization, the entropy encoding unit 56 may entropy code the quantized transform coefficients. For example, the entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. In the case of context-based entropy encoding, context may be based on neighboring blocks. Following the entropy encoding by the entropy encoding unit 56, the encoded bitstream may be transmitted to another device (e.g., the video decoder 30) or archived for later transmission or retrieval.

The inverse quantization unit 58 and the inverse transform unit 60 may apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame memory 64. The motion compensation unit 44 may also apply one or more interpolation filters to the reconstructed residual block to calculate sub-integer pixel values for use in motion estimation. The summer 62 may add the reconstructed residual block to the motion compensated prediction block produced by the motion compensation unit 44 to produce a reconstructed video block for storage in the reference frame memory 64. The reconstructed video block may then be used by the motion estimation unit 42 and the motion compensation unit 44 as a reference block to inter-code a block in a subsequent video frame.

Figure 3:
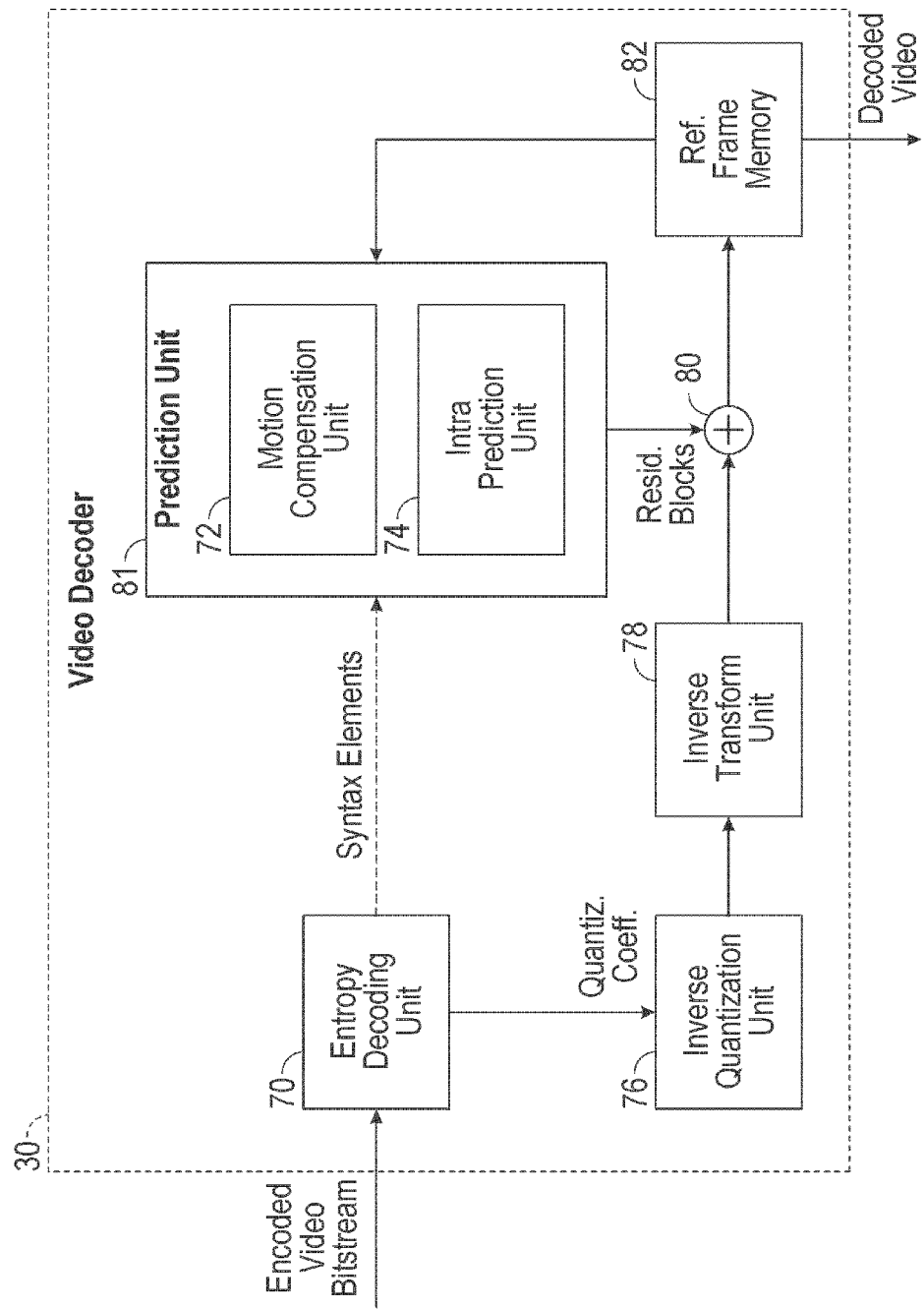
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. The techniques described in this disclosure may utilize various components of the video decoder 30. In some examples, a processor (not shown) may be configured to perform any or all of the techniques.

In the example of FIG. 3, the video decoder 30 includes an entropy decoding unit 70, a prediction unit 81 further including a motion compensation unit 72 and an intra-prediction unit 74, an inverse quantization unit 76, an inverse transformation unit 78, a reference frame memory 82, and a summer 80. The video decoder 30 may perform a decoding pass generally reciprocal to the encoding pass described with respect to the video encoder 20 (e.g., see FIG. 1 and FIG. 2). The motion compensation unit 72 may generate prediction data based on motion vectors received from the entropy decoding unit 70, while the intra-prediction unit 74 may generate prediction data based on intra-prediction mode indicators received from the entropy decoding unit 70.

Conventionally, the video decoder 30 would maintain separate context models for each of the different sizes of TUs supported by the implemented video compression standard. For the HEVC standard, additional transform unit sizes, e.g., 32×32 up to 128×128, may be utilized to improve video coding efficiency, but the additional TU sizes also result in increased memory and computational requirements to maintain the context models for each of the additional transform unit sizes.

To reduce the intermediate buffering requirements for larger TU sizes, the techniques described in this disclosure may include zeroing out a high frequency subset of transform coefficients included in a transform coefficient matrix with the video encoder 20 from FIG. 2. The zeroed-out transform coefficients within the transform coefficient matrix may simply be set equal to zero. Therefore, the entropy decoding unit 70 may receive an encoded bitstream that represents encoded coefficients associated with a retained coefficient block having a second size within the transform coefficient matrix originally having a first size. The entropy decoding unit 70 may decode the coefficients into the retained coefficient block within the transform coefficient matrix having the first size. The transform coefficient matrix may then include the coefficients within the retained coefficient block of the second size, and zeroes that represent the remaining coefficients within the transform coefficient matrix.

In this way, the process of zeroing out transform coefficients in the video encoder 20 may also reduce the intermediate buffering requirements for larger TU sizes when performing an inverse transform in the video decoder 30. As an example, the inverse transform unit 78 may apply a one-dimensional inverse transform in a first direction, e.g., row-wise, to the transform coefficients in a retained coefficient block having size 16×16 within a transform coefficient matrix having size 32×32. After the row inverse transform, the video decoder 30 may only need to buffer the intermediate residual data transformed from the coefficients within the retained coefficient block, which comprises only one-half of the transform coefficient matrix, e.g., 32×16 coefficients. The inverse transform unit 78 may then apply the one-dimensional inverse transform in a second direction, e.g., column-wise, to the intermediate residual data in the TU. In this way, the inverse transform unit 78 may generate the transform coefficient matrix originally of size 32×32 by including the residual data in the retained coefficient block having size 16×16 and adding zeroes to represent the remaining residual data in the TU.

During the decoding process, the video decoder 30 may receive an encoded video bitstream that represents video blocks of an encoded video slice and associated syntax elements from the video encoder 20. The entropy decoding unit 70 of the video decoder 30 entropy decodes the bitstream to generate quantized coefficients, motion vectors or intra-prediction mode indicators, and other syntax elements. The entropy decoding unit 70 may then forward the motion vectors to and other syntax elements to the motion compensation unit 72. The video decoder 30 may receive the syntax elements at the video slice level and/or the video block level.

When the video slice is coded as an intra-coded (I) slice, the intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, the motion compensation unit 72 may produce predictive blocks for a video block of the current video slice based on the motion vectors and other syntax elements received from the entropy decoding unit 70. The predictive blocks may be produced from one of the reference pictures within one of the reference picture lists. The video decoder 30 may construct the reference frame lists, List 0 and List 1, using default construction techniques based on reference pictures stored in the reference frame memory 82. The motion compensation unit 72 may determine prediction information for a video block of the current video slice by parsing the motion vectors and other syntax elements, and use the prediction information to produce the predictive blocks for the current video block being decoded. For example, the motion compensation unit 72 may use some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

The motion compensation unit 72 may also perform interpolation based on interpolation filters. The motion compensation unit 72 may use interpolation filters as used by the video encoder 20 during encoding of the video blocks to calculate interpolated values for sub-integer pixels of reference blocks. In this case, the motion compensation unit 72 may determine the interpolation filters used by the video encoder 20 from the received syntax elements and use the interpolation filters to produce predictive blocks.

The inverse quantization unit 76 may inverse quantize, e.g., de-quantize, the quantized transform coefficients provided in the bitstream and decoded by the entropy decoding unit 70. The inverse quantization process may include use of a quantization parameter QPY calculated by the video decoder 30 for each video block in the video slice to determine a degree of quantization and, likewise, a degree of inverse quantization that should be applied.

The inverse transform unit 78 may apply an inverse transform, e.g., an inverse DCT, an inverse integer transform, or a conceptually similar inverse transform process, to the transform coefficients in order to produce residual blocks in the pixel domain. After the motion compensation unit 72 generates the predictive block for the current video block based on the motion vectors and other syntax elements, the video decoder 30 may form a decoded video block by summing the residual blocks from the inverse transform unit 78 with the corresponding predictive blocks generated by the motion compensation unit 72. The summer 80 may perform this summation operation. A deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture may then be stored in the reference picture memory 82, which may store reference pictures used for subsequent motion compensation. The reference frame memory 82 may also store decoded video for later presentation on a display device, such as the display device 32 of FIG. 1.

Figure 4:
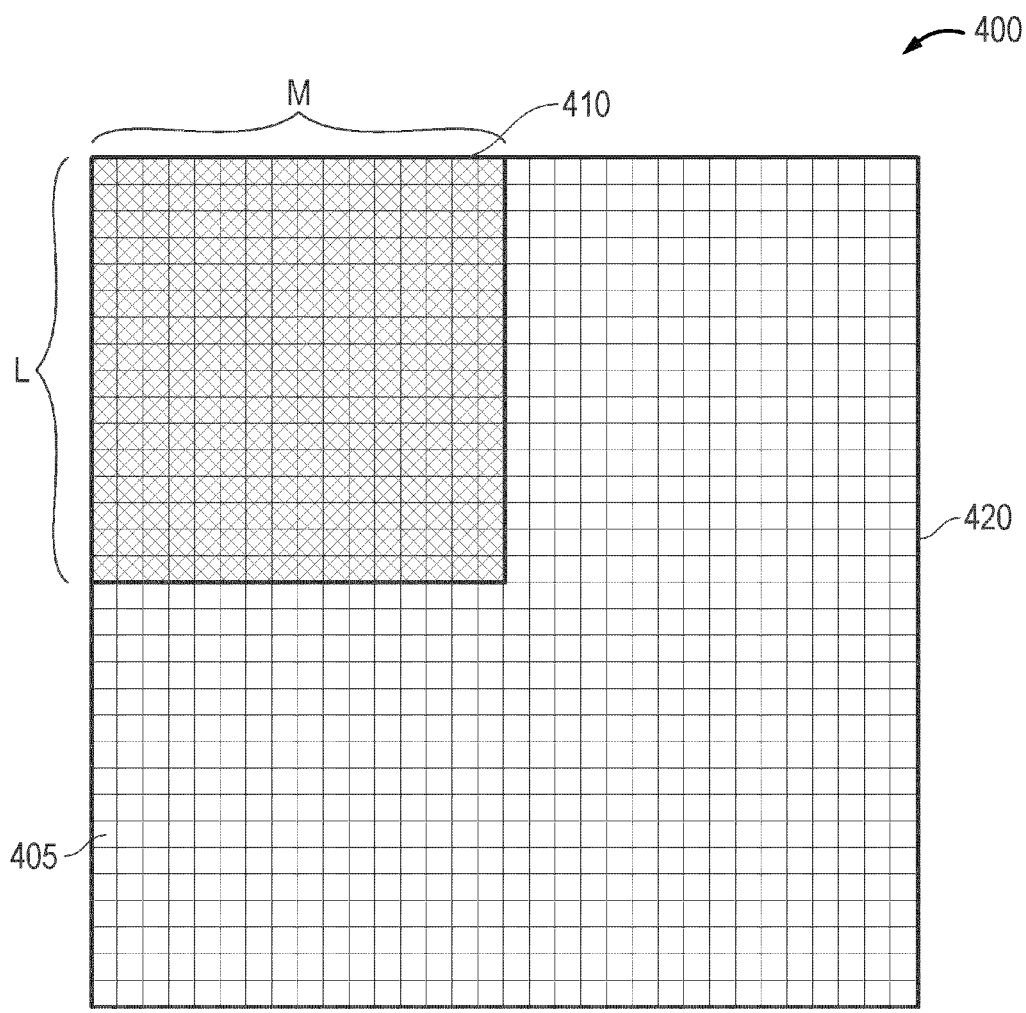
FIG. 4 illustrates one example of a transform coefficient matrix that may be used to transform a video block from the pixel domain into the coefficient domain.

FIG. 4 illustrates one example of a transform coefficient matrix 400 (or "coefficient matrix" or "matrix") that may be used to transform a video block from the pixel domain into the coefficient domain. The transform coefficient matrix 400 contains a series of rows (e.g., 32 rows) and a series of columns (e.g., 32 columns) to form a particular matrix size (e.g., 32×32). Each box 405 depicted in the transform coefficient matrix 400 contains an individual transform coefficient value (not shown), each value being an integer with a numerical range. For convenience, only one box 405 is labeled. In the illustrated example, the transform coefficient matrix 400 includes 1,024 individual transform coefficient values (e.g., 32×32). The total transform coefficient matrix 400 size includes an inner region 410 and an outer region 420 together. In this example, the inner region 410 may be defined as the top-left portion of the transform coefficient matrix 400 (e.g., one-quarter of its whole), as represented by the M×L region.

Figure 6:
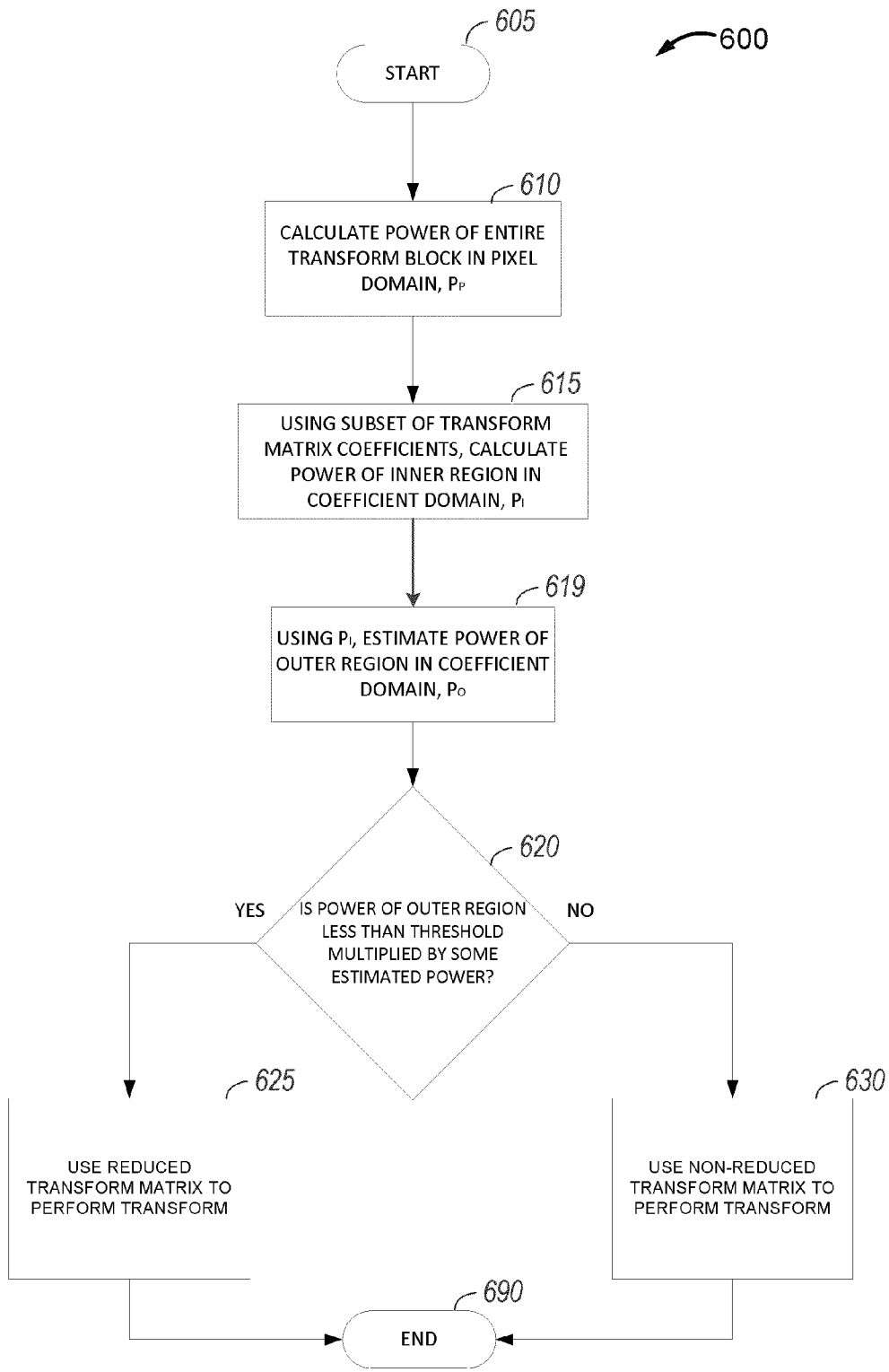
FIG. 6 illustrates a flowchart of one method for a transform processing unit to determine whether to zero-out a subset of coefficients of a transform coefficient matrix during matrix multiplication.
Figure 7:
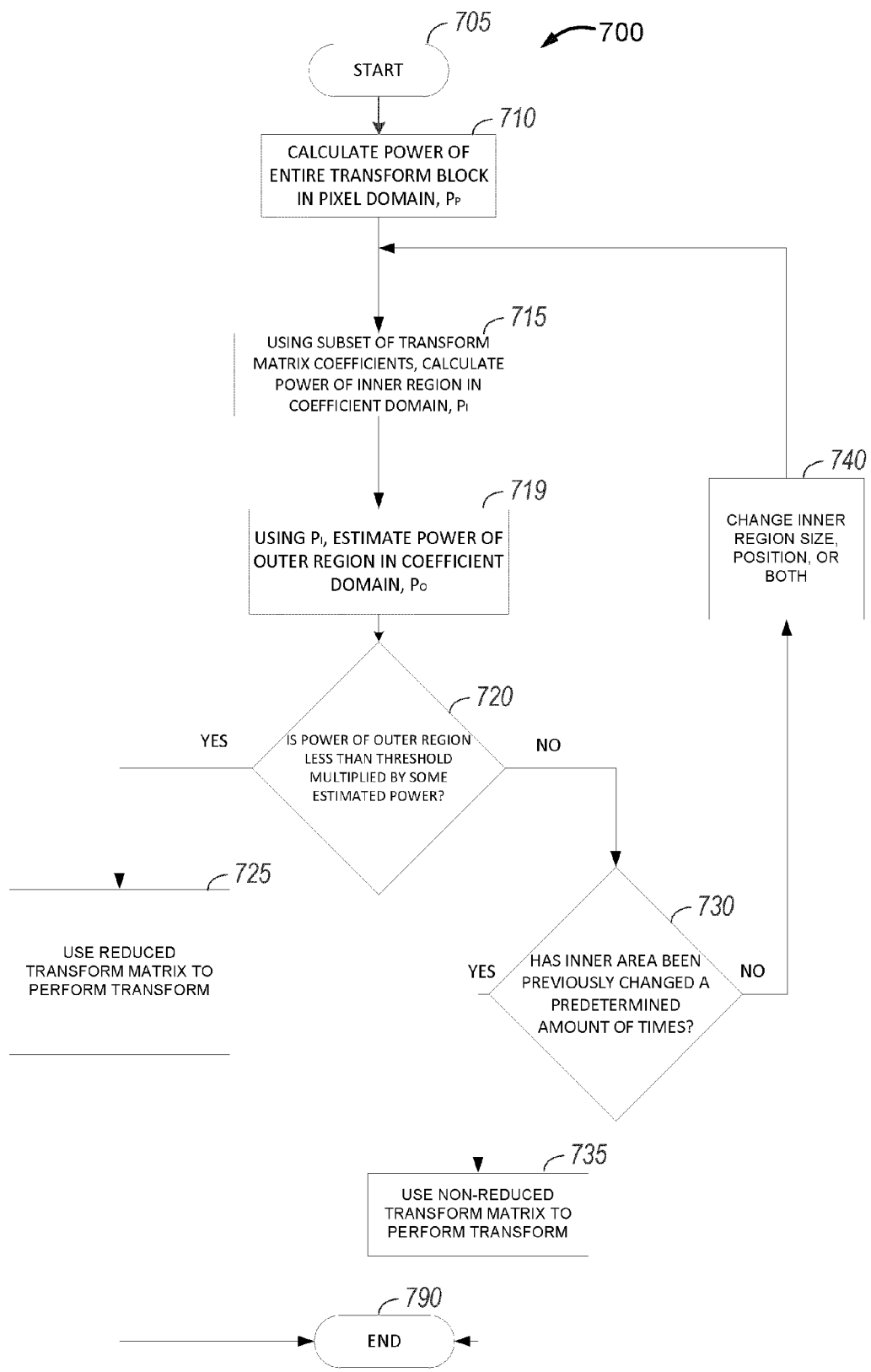
FIG. 7 illustrates a flowchart of a further method for a transform processing unit to determine whether to zero-out a subset of coefficients of a transform coefficient matrix during matrix multiplication.

In one embodiment, a transform processing unit (e.g., the transform processing unit 52 from FIG. 2) may be configured to process the inner region 410 to determine whether to zero-out the outer region 420, as further described in relation to FIGS. 6-7. To accomplish this, the transform processing unit 52 may determine a difference between a power of the outer region 420 and a total power of the transform coefficient matrix 400 by mathematically manipulating a calculated power of the inner region 410 and a pixel domain power calculation.

As discussed above, the coefficients located outside of the inner region 410 (e.g., the coefficients in the outer region 420) may be zeroed-out based on determinations made using the methods of this disclosure and as further described with respect to FIGS. 6 and 7 below. On the contrary, the coefficients located within the inner region 410 may remain non-zeroed out. The darkened square border in the top-left of the transform coefficient matrix 400 may represent the boundary between zeroed-out and non-zeroed-out coefficients in the transform coefficient matrix 400. A size (e.g., M×L) and a shape (e.g., square) of the inner region 410 may be selected based on coding complexity requirements for the coding process. The inner region 410 may be of a square shape, a rectangular shape, an arc shape, a triangular shape, or of any other shape.

In this example, the transform processing unit 52 may be configured to generate the inner region 410 with a size of M×L (e.g., 16×16 in this case) within the transform coefficient matrix 420, originally of size 32×32]. The transform coefficient matrix 400 may have a smaller or larger size than 32×32 (e.g., 16×16 or 64×64). When the inner region 410 has been defined, the transform processing unit 52 may zero-out all coefficients within the transform coefficient matrix 400 that fall outside of the inner region 410 (e.g., all of the coefficients in the outer region 420). The zeroed-out subset (e.g., the unshaded blocks in the transform coefficient matrix 400) may include coefficients with frequency values that are higher than the coefficients within the inner region 410 of the transform coefficient matrix 400. On the contrary, the coefficients located within the inner region 410 may include coefficients with lower spatial frequency.

By zeroing out three-quarters of the transform coefficients, the transform processing unit 52 may significantly reduce and simplify calculations performed during matrix multiplication by only computing the inner M×L coefficients within the inner region 410, as discussed above. For example, when the inner region 410 is defined as a 16×16 out of a 32×32 transform coefficient matrix, then by zeroing out all of the coefficients outside of the inner region 410, the transform processing unit 52 may reduce its computations by a corresponding percentage (e.g., up to 62.5% in this example). In this way, these techniques may reduce computational resource requirements and increase the coding efficiency of the video encoder 20. Because less computational resources are required to multiply by zeroes than the resources required to multiply by non-zeroes, these techniques may be especially useful for larger transform unit sizes (e.g., within the HEVC standard, which may typically use 32×32 transforms coefficients to perform its matrix multiplications).

In some implementations, the coefficients in the outer region 420 may be zeroed out in all cases (e.g., "blindly"). However, zeroing out the coefficients blindly may result in high performance loss for the transform processing unit 52. Therefore, in other implementations, the coefficients in the outer region 420 may be zeroed out adaptively, for example, after the transform processing unit 52 and/or other components of the video encoder 20 have followed predetermined methods. These methods are described in regards to FIGS. 6 and 7 below.

Figure 5A:
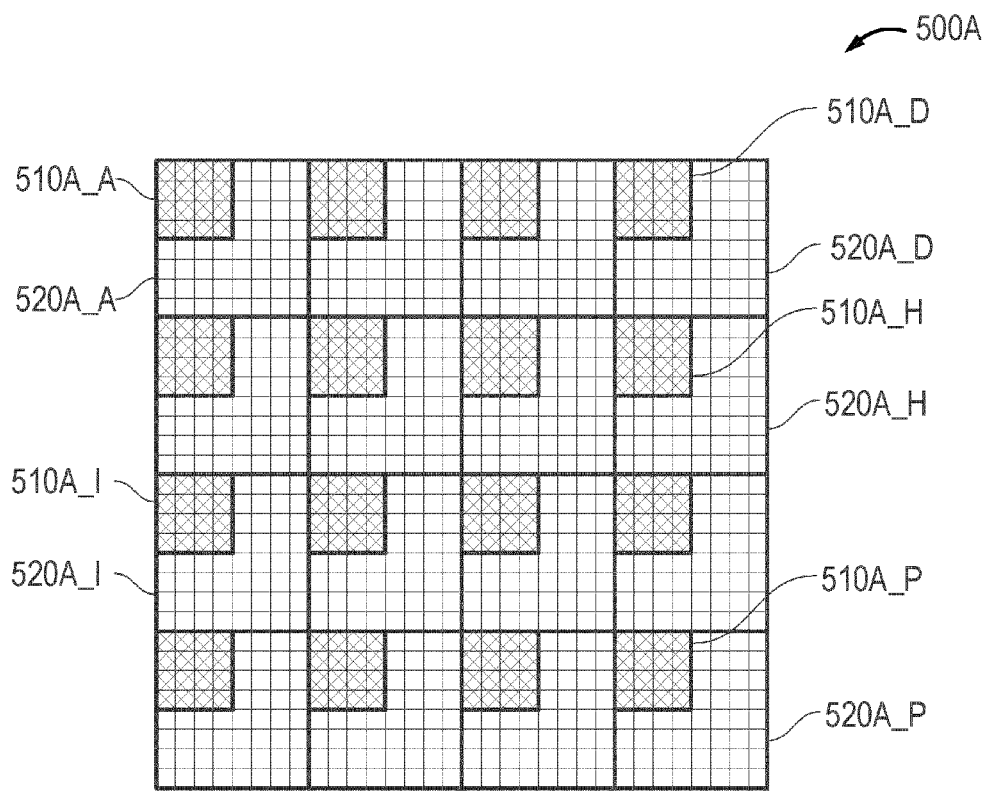
FIGS. 5A and 5B illustrate further examples of transform coefficient matrices that may be used to transform a video block from the pixel domain into the coefficient domain.
Figure 5B:
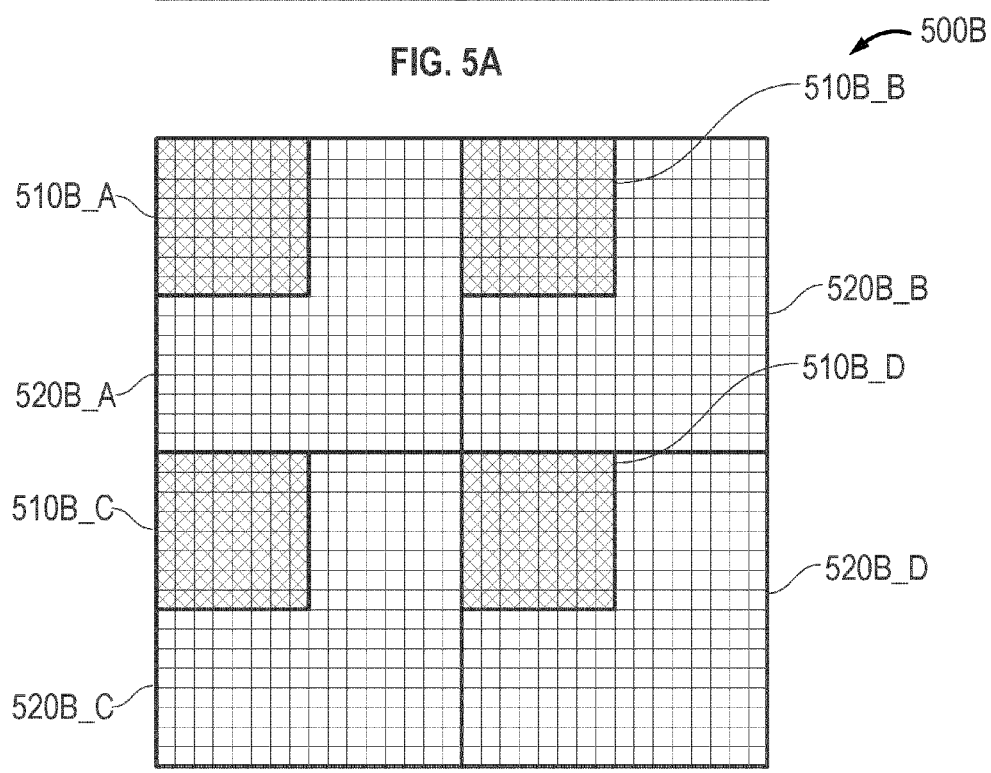

FIGS. 5A and 5B illustrate further examples of transform coefficient matrices 500A and 500B, respectively, that may be used to transform a video block from the pixel domain into the coefficient domain. Similar to the function of the transform coefficient matrix 400 described in relation to FIG. 4, the transform coefficient matrices 500A and 500B may be processed to determine a difference between a power of an outer region and a total power (or an inner region) to determine whether to zero-out the coefficients in their respective outer regions.

Contrary to the example described in FIG. 4, the transform coefficient matrix 500A or 500B may be divided into corresponding parts. In this example, the transform coefficient matrix 500A (e.g., a 32×32 matrix) may be divided into sixteen equal parts (e.g., each of size 8×8), and the transform coefficient matrix 500B (e.g., another 32×32 matrix) may be divided into four equal parts (e.g., each of size 16×16). In some implementations, the parts may not be of equal size. Once the transform coefficient matrix 500A or 500B has been divided into parts, the inner region may be defined as the sum of the top-left shaded portion of each part (e.g., 25% of the total size of the part). The top-left shaded portions (e.g., the sum of which make up the corresponding inner region) of the transform coefficient matrix 500A and 500B are labeled as 510A_A through 510A_P and as 510B_A and 510B_D. For convenience, only some of the labels for the top-left shaded portions of the transform coefficient matrix 500A are depicted. In one implementation, if A×A represents the size of each of the parts of the transform coefficient matrix 500A or 500B, then the top-left shaded portions of each of those parts may be represented by a size of $$\frac{A}{2} \times \frac{A}{2}.$$

In the case of the transform coefficient matrix 500A, the parts may be represented by 520A_A through 520A_P (for convenience, not all parts have been labeled), and as described above, their corresponding top-left portions may be represented by the shaded regions 510A_A through 510A_P (again, not all regions have been labeled). Therefore, the inner region for the transform coefficient matrix 500A may be represented as the sum of the shaded regions 510A_A through 510A_P (hereinafter referred to as "the inner region A"). Similarly, in the case of the transform coefficient matrix 500B, the parts may be represented by 520B_A through 520B D, and their corresponding top-left portions may be represented by the shaded regions 520B_A through 520A_D. Therefore, the inner region for the transform coefficient matrix 500B may be represented as the sum of the shaded regions 510B_A through 510B_D (hereinafter referred to as "the inner region B").

As explained in regards to FIG. 4 above, a size and shape of the inner region A or B may be selected based on coding complexity requirements for the coding process. In one embodiment, selecting a smaller sized inner region may decrease computational requirements (e.g., speed up computations) but also decrease overall performance (e.g., lower the final picture quality). In another embodiment, selecting a larger sized inner region may increase computational requirements (e.g., slow down computations) but also increase overall performance (e.g., increase the final picture quality). Each box depicted inside of the transform coefficient matrix 500A or 500B may represent a corresponding transform coefficient in the transform matrix. The coefficients located outside of the inner region A or B may be zeroed-out based on determinations made using the methods of this disclosure and as further described with respect to FIGS. 6 and 7 below. On the contrary, the coefficients located within the inner region A or B may remain non-zeroed out. The darkened square border in the top-left of each of the parts of the transform coefficient matrix 500A or 500B may represent the boundary between zeroed-out and non-zeroed-out coefficients in the matrix. In other embodiments, the individual inner region areas (e.g., 510A_A through 510A_P of transform coefficient matrix 500A) may be of a square shape, a rectangular shape, an arc shape, a triangular shape, or of any other shape.

In this example, a transform processing unit (e.g., the transform processing unit 52 from FIG. 2) may be configured to calculate a power associated with the coefficients within the inner region A or B within the transform coefficient matrix 500A or 500B, respectively. The transform coefficient matrix 500A or 500B may have a smaller or larger size than 32×32 (e.g., 16×16 or 64×64). In this example, the inner region A includes sixteen 4×4 blocks, which if arranged adjacent to one another would form a 16×16 block. Similarly, the inner region B consists of four 8×8 blocks, which if arranged adjacent to one another would form a 16×16 block. When the inner region A or B has been defined, the transform processing unit 52 may zero-out all coefficients within the transform coefficient matrix 500A or 500B that fall outside of the inner region A or B. The zeroed-out subset (e.g., the unshaded blocks in the transform coefficient matrix 500A or 500B) may include coefficients with frequency values that are higher than the coefficients within the inner region A or B of the transform coefficient matrix 500A or 500B. On the contrary, the coefficients located within the inner region A or B may include coefficients with lower spatial frequency.

As demonstrated in FIG. 4, by zeroing out three-quarters of the transform coefficients of the coefficient matrix 520, the transform processing unit 52 may significantly reduce its calculations during the matrix multiplication by only computing the inner M×L coefficients within the inner region A or B. For example, when the inner region A or B is defined as illustrated in FIGS. 5A and 5B, the transform processing unit 52 may reduce its computations by a corresponding percentage (e.g., up to 62.5% in these examples). In this way, these techniques may reduce computational resource requirements and increase the coding efficiency of the video encoder 20. This may be especially useful for larger transform unit sizes, e.g., 32×32 up to 128×128, for example, within the HEVC standard.

In some implementations, the coefficients outside of the inner region A or B may be zeroed out in all cases (e.g., "blindly"). However, zeroing out the coefficients blindly may result in high performance loss for the transform processing unit 52. Therefore, in other implementations, the coefficients outside of the inner region A or B may be zeroed out adaptively, for example, after the transform processing unit 52 and/or other components of the video encoder 20 have followed predetermined methods. These methods are described in regards to FIGS. 6 and 7 below.

FIG. 6 illustrates a flowchart 600 of one method for a transform processing unit (e.g., the transform processing unit 52 of FIG. 2) to determine whether to zero-out a subset of coefficients of a transform coefficient matrix during matrix multiplication, as explained in regards to FIG. 4. This method may be referred to as a "mode decision process." As described above, zeroing out the coefficients blindly may result in high performance loss for the transform processing unit 52. This flowchart (and the flowchart illustrated in FIG. 7) represent two methods in which the transform processing unit 52 and/or the video encoder 20 may adaptively zero-out coefficients based on a difference of powers compared to a threshold.

At block 605, the transform processing unit 52 begins the method with a residual pixel domain matrix and a fixed forward transform matrix. In one implementation, the forward transform matrix may be a 32×32 forward transform matrix used in HEVC. The transform processing unit 52 may use the fixed forward transform matrix to transform the residual pixel domain matrix into a coefficient domain matrix. The transform processing unit 52 may reduce its computational requirements by only calculating a portion of the matrix power in the coefficient domain by transforming using the simplified, zeroed-out version of the forward transform as described above in regards to FIG. 4. This is possible, because the total power in the coefficient domain is equal to the total power in the pixel domain (Equation (1)).

As an example, subtracting a power of an inner region (e.g., the inner region as described in regards to FIG. 4) in the coefficient domain ($P_I$) from a total power in the pixel domain ($P_P$) may result in a value that may be interpreted as the power outside of the inner region in the coefficient domain ($P_O$) (Equation (2)). Adding this value to $P_I$ may result in the total power in the coefficient domain ($P_C$) (Equation (3)). In one example, $P_P$ and $P_I$ may be calculated according to Equations (4) and (5) below, respectively. It is to be understood that Equations (2)-(5) each represent only one example of calculating their respective variables. $P_C$, $P_O$, $P_P$ and $P_I$ may also be calculated in any number of other ways, which may include manipulating any or all of the variables in different ways. Further, all of the above power computations may be based on the sum of squared errors (SSE) or the sum of absolute differences (SAD).

$$P_C = P_P \quad (1)$$

$$P_P - P_I = P_O \quad (2)$$

$$P_O + P_I = P_C \quad (3)$$

$$P_P = \Sigma_{i=0}^{1023} x_i^2, \text{ where } x_i \text{ is the luma value of pixel } i \quad (4)$$

$$P_I = \Sigma_{i \in M \times N} X_i^2, \text{ where } X_i \text{ includes the transformed coefficients in the inner region, } M \times N \text{ (in this example, the 16×16 inner region)} \quad (5)$$

As one example of applying the above process, then at block 610, the transform processing unit 52 may calculate the power of the entire transform block in the pixel domain (e.g., the total power in the pixel domain, $P_P$). Then at block 615, using a subset of the transform matrix coefficients (e.g., the inner region as described in regards to FIGS. 4-5), the transform processing unit 52 may calculate the power of the inner region in the coefficient domain (e.g., $P_I$). In one implementation, the subset of the transform matrix coefficients may be the inner region as described in regards to FIGS. 4-5 above, where the coefficients lying outside of the inner region may be zeroed out. In another implementation, the transform processing unit 52 may load some coefficients from a memory, including an array of zeroes, and then perform matrix multiplication while processing only an M×N row-column subset of the coefficients. In any case, then at block 619, using $P_I$, the transform processing unit 52 may estimate the power of the outer region (e.g., $P_O$, the power of the outer region as described above and in regards to FIGS. 4-5) in the coefficient domain (e.g., by subtracting $P_I$ from $P_P$). The above process is only one example; in some implementations, the transform processing unit 52 may perform the above steps or calculations in other ways or orders.

In one example, having determined the power of the outer region, then at block 620, the transform processing unit 52 may determine whether the power of the outer region is less than a predetermined threshold value multiplied by some estimated power (e.g., $P_O < \text{Thresh}*P_P$, $P_I > \text{Thresh}*P_P$, $P_I >> \text{Thresh}*P_O$, or any other equivalent mathematical comparison). If it is, then at block 625, the transform processing unit 52 may use the reduced (e.g., zeroed-out) transform matrix to perform the transform as described above and in regards to FIG. 4. If not, then at block 630, the transform processing unit 52 may use the non-reduced (e.g., non-zeroed out) transform matrix to perform the transform. In either case, the transform processing unit 52 ends the method at block 690.

FIG. 7 illustrates a flowchart 700 of a further method for a transform processing unit (e.g., the transform processing unit 52 of FIG. 2) to determine whether to zero-out a subset of coefficients of a transform coefficient matrix during matrix multiplication, as explained in regards to FIG. 4 and/or FIG. 5. This method may be referred to as a "mode decision process." Contrary to the method described in FIG. 6, in this example, if the transform processing unit 52 determines that the zero-out method according to the inner region described in FIG. 4 would result in excessive power loss, then the transform processing unit 52 may still not be required to use the non-reduced transform matrix. Instead, the transform processing unit 52 may first attempt to use a different inner region (e.g., the inner regions described in regards to FIG. 5) to qualify the zero-out method by using a simpler transform (e.g., a Hadamard transform or smaller-size transforms, such as 4×4 or 8×8 transforms).

It follows then, that at block 705, the transform processing unit 52 again begins the method with a residual pixel domain matrix and a fixed forward transform matrix. In one implementation, the forward transform matrix may be a 32×32 forward transform matrix used in HEVC. The transform processing unit 52 may reduce its computational requirements by only calculating a portion of the matrix power in the coefficient domain by transforming using the simplified zeroed out version of the forward transform as described above in regards to FIGS. 4-6, Equations (1)-(3), or by using any other appropriate equation. The calculations for $P_P$ and $P_I$ may further differ as described below. Again, all of the above power computations may be based on the sum of squared errors (SSE) or the sum of absolute differences (SAD).

The calculations for $P_P$ and $P_I$ may differ depending on the size and location of the chosen inner region. For this example, it is assumed that the transform processing unit 52 has chosen to use the inner region as illustrated in FIG. 5A. Thus, as explained above in regards to FIG. 5, the transform coefficient matrix has been divided into sixteen equal 8×8 parts, each containing a top-left 4×4 portion, all of which portions sum to the transform coefficient matrix's total inner portion. Given this situation, $P_P$ and $P_I$ may be calculated as represented in Equations (6) and (7), respectively, but may also be calculated in any number of other appropriate ways.

$$P_P = \Sigma_{i=0}^{15} \Sigma_{j=0}^{63} X_{ij}^2, \text{ where } X_i \text{ is the luma value of pixel } i \text{ and } X_{ij} \text{ is the } j^{th} \text{ coefficient in the } i^{th} \text{ 8×8 block} \quad (6)$$

$$P_I = \Sigma_{i=0}^{16} \Sigma_{j \in 4 \times 4} X_{ij}^2, \text{ where } X_i \text{ is the luma value of pixel } i \text{ and } X_{ij} \text{ is the } j^{th} \text{ coefficient in the } i^{th} \text{ 8×8 block} \quad (7)$$

Then at blocks 710, 715, and 719, the transform processing unit 52 may calculate $P_P$, $P_I$, and $P_O$, respectively. To accomplish this, the transform processing unit 52 may use the equations described above, or it may use any number of other appropriate calculations or mathematical manipulations.

In one example, having determined the power of the outer region, then at block 720, the transform processing unit 52 may determine whether the power of the outer region is less than a predetermined threshold value multiplied by some estimated power (e.g., $P_O < \text{Thresh}*P_P$). If it is, then at block 725, the transform processing unit 52 may use the reduced (e.g., zeroed-out) transform matrix to perform the transform as described above and in regards to FIG. 4.

If not, and contrary to the method described in FIG. 6, then at block 730, the transform processing unit 52 may determine whether the inner area has been previously changed a predetermined amount of times. If not, then at block 740, the transform processing unit 52 may change the inner region size, position, or both (e.g., the inner regions illustrated in FIG. 5) and then return to block 715. However, if the transform processing unit 52 has already performed this step more than a predetermined amount of times, then at block 730, the transform processing unit 52 may use the non-reduced (e.g., non-zeroed out) transform matrix to perform the transform and end the method at block 790.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A video encoder, comprising:
a memory configured to store a video block; and
a processor in communication with the memory, the processor configured to:
determine a full power value of the video block;
determine a reduced transform coefficient matrix, wherein the reduced transform coefficient matrix comprises an inner region of zero or non-zero values of the same inner region of a full transform coefficient matrix and an outer region of zero values, wherein the reduced transform coefficient matrix and the full transform coefficient matrix have the same size;
determine a partial power value of the video block using the reduced transform coefficient matrix;
transform the video block from a pixel domain to a coefficient domain using the reduced transform coefficient matrix when the partial power is less than a product of a threshold value and the full power value; and
encode the transformed video block.

2. The video encoder of claim 1, wherein the video block comprises a plurality of luma pixel values, and wherein the processor is configured to determine the full power value by summing the squares of the luma pixel values.

3. The video encoder of claim 1, wherein the video block has a size of 32 pixels ×32 pixels.

4. The video encoder of claim 1, wherein the full transform coefficient matrix has a size of 32 coefficients ×32 coefficients, and wherein the reduced transform coefficient matrix inner region is the same as the upper left 16×16 coefficient values of the full transform coefficient matrix.

5. The video encoder of claim 1, wherein the processor is further configured to determine the reduced transform coefficient matrix by storing the full transform coefficient matrix in the memory and converting all coefficient values outside of the inner region to zero.

6. The video encoder of claim 1, wherein the processor is further configured to determine the reduced transform coefficient matrix by storing only the values of the full transform coefficient matrix that are within the inner region.

7. The video encoder of claim 1, wherein the processor is further configured to determine the partial power of the video block by transforming the video block using the reduced transform coefficient matrix and summing the squares of the values within the transformed block.

8. The video encoder of claim 1, wherein the processor is further configured to transform the video block from the pixel domain to the coefficient domain using the full transform coefficient matrix when the partial power is not less than the product.

9. The video encoder of claim 1, wherein the processor is further configured to change the inner region size, position, or both when the partial power is not less than the product.

10. A method of encoding video, the method comprising:
storing a video block;
determining a full power value of the video block;
determining a reduced transform coefficient matrix, wherein the reduced transform coefficient matrix comprises an inner region of zero or non-zero values of the same inner region of a full transform coefficient matrix and an outer region of zero values, wherein the reduced transform coefficient matrix and the full transform coefficient matrix have the same size;
determining a partial power value of the video block using the reduced transform coefficient matrix;
transforming the video block from a pixel domain to a coefficient domain using the reduced transform coefficient matrix when the partial power is less than a product of a threshold value and the full power value; and
encoding the transformed video block.

11. The method of claim 10, wherein the video block comprises a plurality of luma pixel values, and the method further comprising determining the full power value by summing the squares of the luma pixel values.

12. The method of claim 10, wherein the video block has a size of 32 pixels ×32 pixels.

13. The method of claim 10, wherein the full transform coefficient matrix has a size of 32 coefficients ×32 coefficients, and wherein the reduced transform coefficient matrix inner region is the same as the upper left 16×16 coefficient values of the full transform coefficient matrix.

14. The method of claim 10, further comprising determining the reduced transform coefficient matrix by storing the full transform coefficient matrix and converting all coefficient values outside of the inner region to zero.

15. The method of claim 10, further comprising determining the reduced transform coefficient matrix by storing only the values of the full transform coefficient matrix that are within the inner region.

16. The method of claim 10, further comprising determining the partial power of the video block by transforming the video block using the reduced transform coefficient matrix and summing the squares of the values within the transformed block.

17. The method of claim 10, further comprising transforming the video block from the pixel domain to the coefficient domain using the full transform coefficient matrix when the partial power is not less than the product.

18. The method of claim 10, further comprising changing the inner region size, position, or both when the partial power is not less than the product.

19. A non-transitory computer-readable medium comprising code that, when executed, causes an apparatus to:
store a video block;
determine a full power value of the video block;
determine a reduced transform coefficient matrix, wherein the reduced transform coefficient matrix comprises an inner region of zero or non-zero values of the same inner region of a full transform coefficient matrix and an outer region of zero values, wherein the reduced transform coefficient matrix and the full transform coefficient matrix have the same size;
determine a partial power value of the video block using the reduced transform coefficient matrix;
transform the video block from a pixel domain to a coefficient domain using the reduced transform coefficient matrix when the partial power is less than a product of a threshold value and the full power value; and encode the transformed video block.

20. The computer-readable medium of claim 19, wherein the video block comprises a plurality of luma pixel values, and further comprising code that, when executed, causes the apparatus to determine the full power value by summing the squares of the luma pixel values.

21. The computer-readable medium of claim 19, further comprising code that, when executed, causes the apparatus to determine the partial power of the video block by transforming the video block using the reduced transform coefficient matrix and summing the squares of the values within the transformed block.

22. The computer-readable medium of claim 19, further comprising code that, when executed, causes the apparatus to transform the video block from the pixel domain to the coefficient domain using the full transform coefficient matrix when the partial power is not less than the product.

23. An apparatus for encoding video, comprising:
means for storing a video block;
means for determining a full power value of the video block;
means for determining a reduced transform coefficient matrix, wherein the reduced transform coefficient matrix comprises an inner region of zero or non-zero values of the same inner region of a full transform coefficient matrix and an outer region of zero values, wherein the reduced transform coefficient matrix and the full transform coefficient matrix have the same size;
means for determining a partial power value of the video block using the reduced transform coefficient matrix;
means for transforming the video block from a pixel domain to a coefficient domain using the reduced transform coefficient matrix when the partial power is less than a product of a threshold value and the full power value; and
means for encoding the transformed video block.

24. The apparatus of claim 23, wherein the video block comprises a plurality of luma pixel values, and further comprising means for determining the full power value by summing the squares of the luma pixel values.

25. The apparatus of claim 23, further comprising means for determining the partial power of the video block by transforming the video block using the reduced transform coefficient matrix and summing the squares of the values within the transformed block.

26. The apparatus of claim 23, further comprising means for transforming the video block from the pixel domain to the coefficient domain using the full transform coefficient matrix when the partial power is not less than the product.

* * * * *